US012290906B2

(12) United States Patent
Huang

(10) Patent No.: US 12,290,906 B2
(45) Date of Patent: May 6, 2025

(54) EMPTY-FIRING PREVENTION SAFETY DEVICE FOR A NAIL GUN

(71) Applicant: APACH INDUSTRIAL CO., LTD., Taichung (TW)

(72) Inventor: Chun-Ming Huang, Taichung (TW)

(73) Assignee: Apach Industrial Co., Ltd., Taichung (TW)

( * ) Notice: Subject to any disclaimer, the term of this patent is extended or adjusted under 35 U.S.C. 154(b) by 0 days.

(21) Appl. No.: 18/499,279

(22) Filed: Nov. 1, 2023

(65) Prior Publication Data

US 2025/0091183 A1 Mar. 20, 2025

(30) Foreign Application Priority Data

Sep. 14, 2023 (TW) ................................ 112135078

(51) Int. Cl.
*B25C 1/00* (2006.01)

(52) U.S. Cl.
CPC .................................. *B25C 1/008* (2013.01)

(58) Field of Classification Search
CPC ................................ B25C 1/008; B25C 1/047
See application file for complete search history.

(56) References Cited

U.S. PATENT DOCUMENTS 6,908,021 B1 * 6/2005 Wang ...................... B25C 1/005 227/8
7,303,103 B2 * 12/2007 Wang ...................... B25C 1/047 227/8

* cited by examiner

*Primary Examiner* — Nathaniel C Chukwurah
(74) *Attorney, Agent, or Firm* — Wang Law Firm, Inc.

(57) ABSTRACT

An empty-firing prevention safety device for a nail gun includes: a gun body including an actuating space and a nail groove; a trigger, capable of being pressed, located in the actuating space; and a connecting rod pivoted to the gun body and capable of being moved between an actuating position and a locking position, and including: a sensing portion located in or away from the nail groove, and a limit portion located in the actuating space and facing the abutting portion, when the connecting rod is in the actuating position, the sensing portion moves out of the nail groove, the limit portion is misaligned with the abutting portion, allowing the trigger to be pressed, when the connecting rod is in the locking position, the sensing portion is located in the nail groove, and the limit portion is aligned with the abutting portion, so that the trigger cannot be pressed.

9 Claims, 13 Drawing Sheets

EMPTY-FIRING PREVENTION SAFETY DEVICE FOR A NAIL GUN

BACKGROUND

Field of the Invention

The present invention relates to a safety device for a nail gun, and more particularly to an empty-firing prevention safety device for a nail gun.

Description of Related Art

When using a nail gun, the operators often continuously and quickly fires the nails out of the nail groove of the nail gun. Once the nails in the nail groove of the nail gun are used up and the trigger is pressed for firing, the phenomenon of empty firing of the nail gun's striker will occur. However, due to the fact that there is no any nail for the striker to hit, the striker of the nail gun directly hits the construction object to be nailed, causing significant marks on the construction object or easily causing damage to the striker.

To this end, an empty-firing prevention safety device for nail guns was developed, as shown in FIG. 1, which displays one of the schematic diagrams of the U.S. Pat. No. 7,303,103, when there is no nail in the nail groove 111 of the magazine 11, the spring 12 drives the limit pin 13 outward for a distance, so that the limit portion 131 of the limit pin 13 is aligned to the abutting portion 141 of the trigger 14. At this time, the trigger 14 cannot be pulled, so as to avoid empty firing of the striker of the nail gun; When there are nails in the nail groove 111 of the magazine 11 (not shown), the nail pushes against a first end 151 of the connecting rod 15, causing the connecting rod 15 to rotate clockwise by an angle, and then drives the limit pin 13 inward by a distance through a second end 152 of the connecting rod 15, causing the limit portion 131 of the limit pin 13 to be misaligned with the abutting portion 141 of the trigger 14. At this time, the trigger 14 can be pulled to perform nail shooting.

However, due to a part of structure of the limit pin 13 and the spring 12 that drives the limit pin 13 being located outside the side plates 166 of the gun body 16, the joint between the limit pin 13, the spring 12, and the side plate portions 161 is prone to being stuck or damaged due to oil or dirt, which may cause the safety device of the arresting mechanism of the nail gun anti to fail due to environmental pollution; On the other hand, the arresting mechanism requires too many components and a complex structure to achieve a safety mechanism, highlighting the defects of high production and assembly costs.

SUMMARY

The objective of the present invention is to provide an empty-firing prevention safety device for a nail gun, which can effectively avoid environmental-pollution caused failure.

To achieve the above objective, an empty-firing prevention safety device for a nail gun provided by the invention comprises: a gun body including a first side plate portion, a second side plate portion facing the first side plate portion, an actuating space defined by the first side plate portion and the second side plate portion, and a nail groove; a trigger, capable of being pressed, arranged between the first side plate portion and the second side plate portion of the gun body, and including an abutting portion located in the actuating space; a connecting rod pivoted to the gun body and capable of being moved between an actuating position and a locking position, and including: a sensing portion located in or away from the nail groove, and a limit portion located in the actuating space and facing the abutting portion, when the connecting rod is in the actuating position, the sensing portion moves out of the nail groove, the limit portion is misaligned with the abutting portion, allowing the trigger to be pressed, and when the connecting rod is in the locking position, the sensing portion is located in the nail groove, and the limit portion is aligned with the abutting portion, so as to stop the trigger from being pressed.

The advantage of the present invention is that it not only has a limit portion at one end of the connecting rod, but also places the limit portion in the actuating space of the gun body and make the limit portion be aligned or misaligned with the abutting portion of the trigger, which can indeed avoid empty firing of the nail gun's striker. Therefore, the limit portion of the connecting rod are hidden in the actuating space of the gun body instead of being located outside the gun body, it can effectively avoid environmental-pollution caused failure, and effectively reduce the cost.

Preferably, the connecting rod further includes a side portion located in the actuating space and facing the first side plate portion, the safety device further comprises a spring located between the side portion and the first side plate portion, when there is no nail in the nail groove, the spring pushes the connecting rod from the actuating position to the locking position.

Preferably, the limit portion of the connecting rod includes a limit slope facing the abutting portion of the trigger, and the limit slope is inclined from the first side plate portion towards the second side plate portion and gradually approaches the abutting portion.

Preferably, the connecting rod further includes an actuating concave portion located in the actuating space and adjacent to the limit portion, when the connecting rod is in the actuating position, the actuating concave portion is aligned with the abutting portion of the trigger, and when the connecting rod is in the locking position, the actuating concave portion is misaligned with the abutting portion of the trigger.

Preferably, the gun body is connected to a magazine, the magazine includes the nail groove, and the connecting rod further includes a pivot portion located between the sensing portion and the limit portion and pivoted to the magazine.

Preferably, the abutting portion of the trigger is located in the center of the trigger, and has a width greater than the width of the limit portion of the connecting rod.

Preferably, the connecting rod further includes a pressing portion located outside the actuating space, when the connecting rod is in the locking position, by pressing the pressing portion, the limit portion is misaligned with the abutting portion to allow the trigger to be pressed.

Preferably, the limit portion of the connecting rod includes a limit plane and a limit convex connected to the limit plane, when the connecting rod is in the locking position, the limit plane is aligned with the abutting portion of the trigger, and the limit convex is misaligned with the abutting portion of the trigger.

DETAILED DESCRIPTION

Before providing detailed explanations, it should be noted that in the following explanations, similar components and parts are represented by the same number. At the same time, the directional terms mentioned in the following embodiments, such as up, down, left, right, front or rear, are only referring to the direction of the attached drawings. Therefore, the directional terms used in the embodiments are used to illustrate and not to limit the present invention.

Please refer to FIGS. 2 to 6, the first embodiment of the present invention provides an empty-firing prevention safety device for a nail gun, which essentially includes: a gun body 20, a trigger 30, a connecting rod 40, and a spring 50.

Figure 6:
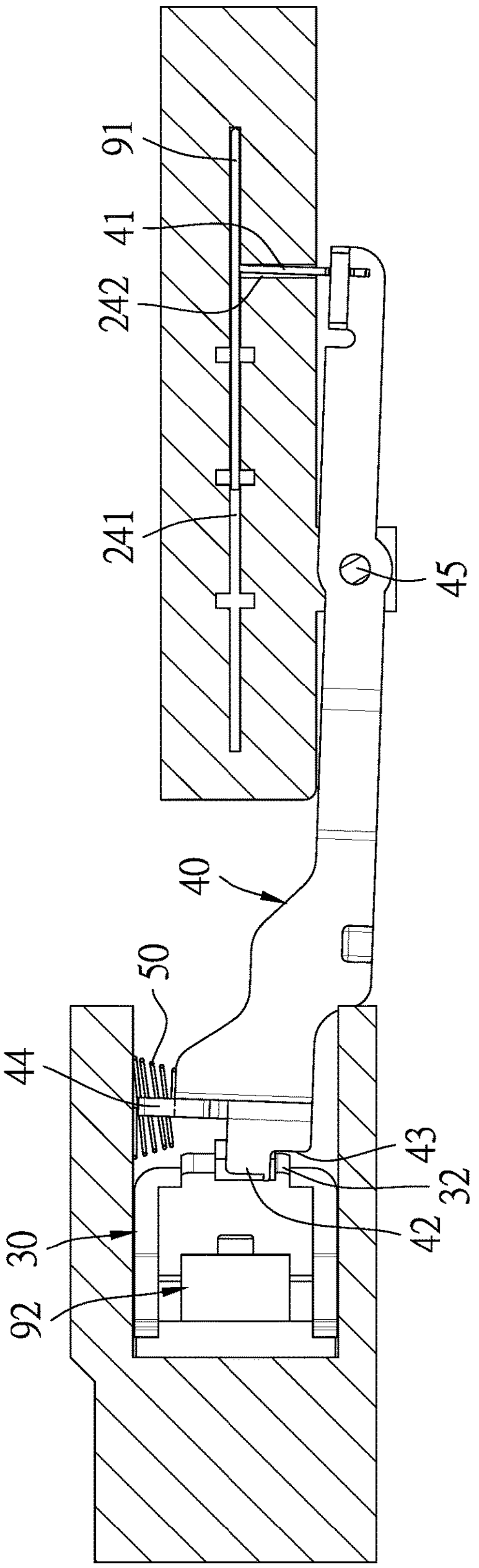
FIG. 6 is a schematic diagram of the first embodiment of the present invention, showing that the connecting rod is in the actuating position.

The gun body 20 includes a first side plate portion 21, a second side plate portion 22 facing the first side plate portion 21, an actuating space 23 defined by the first side plate portion 21 and the second side plate portion 22, and a nail groove 241; In this embodiment, the gun body 20 is connected to a magazine 24. The magazine 24 can be integrated or separated from the gun body 20, and includes the nail groove 241, a side groove 242 connected to the nail groove 241, and a side pivot portion 243. The nail groove 241 is used to accommodate the nail 91 (as shown in FIG. 6); In addition, the gun body 20 is equipped with an actuator 92, which is driven to fire the nail 91. Since the nail shooting method is well known, further explanation is omitted here.

The trigger 30, which can be pressed, is arranged between the first side plate portion 21 and the second side plate portion 22 of the gun body 20, and includes: two oppositely arranged wings 31 pivoted respectively on the first side plate portion 21 and the second side plate portion 22, and an abutting portion 32 located in the actuating space 23; In this embodiment, the trigger 30 is pressed to drive the actuator 92 to operate.

Figure 1:
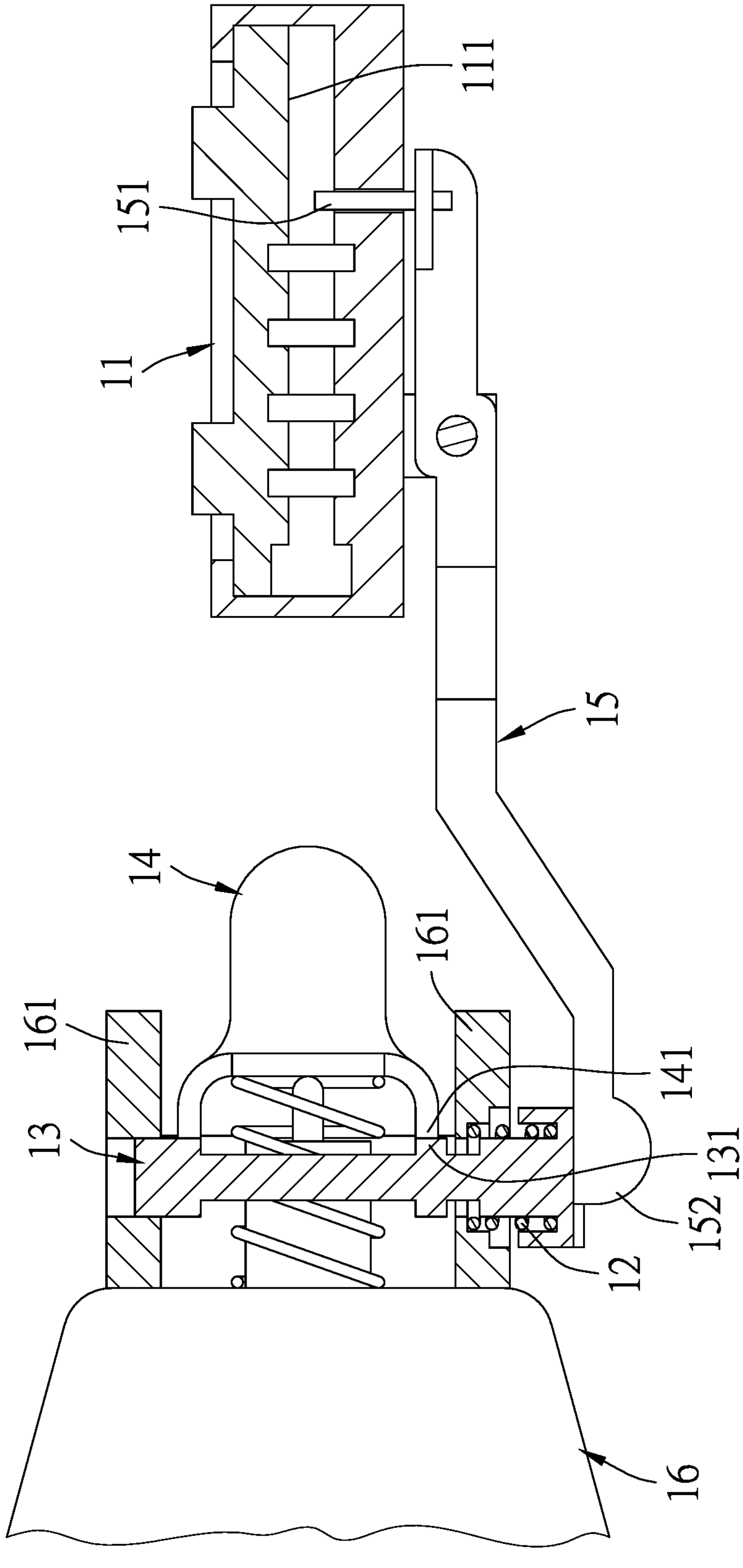
FIG.1 PRIOR ART
FIG. 1 is a schematic diagram of the U.S. Pat. No. 7,303,103.
Figure 2:
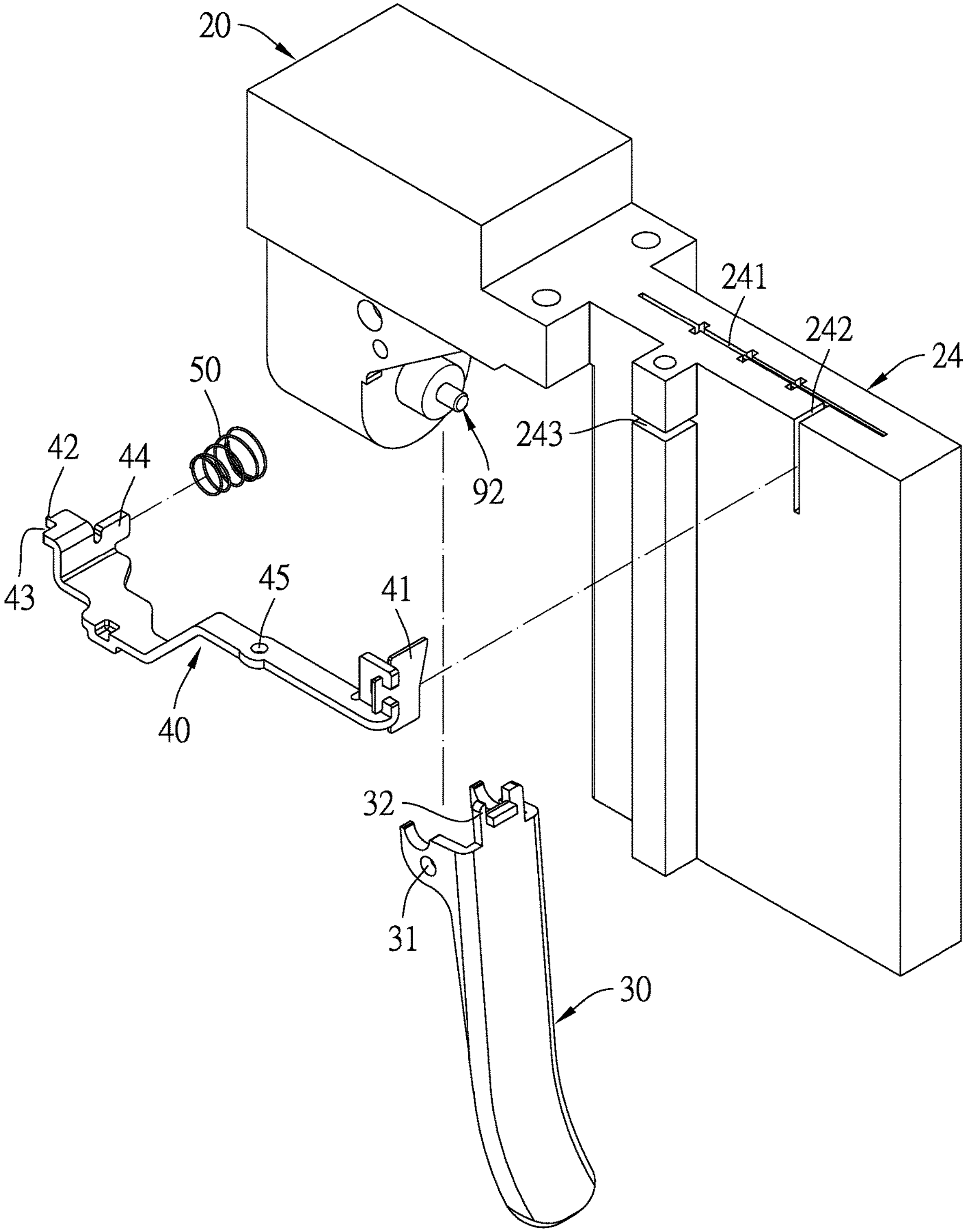
FIG. 2 is a three-dimensional exploded view of the first embodiment of the present invention.
Figure 3:
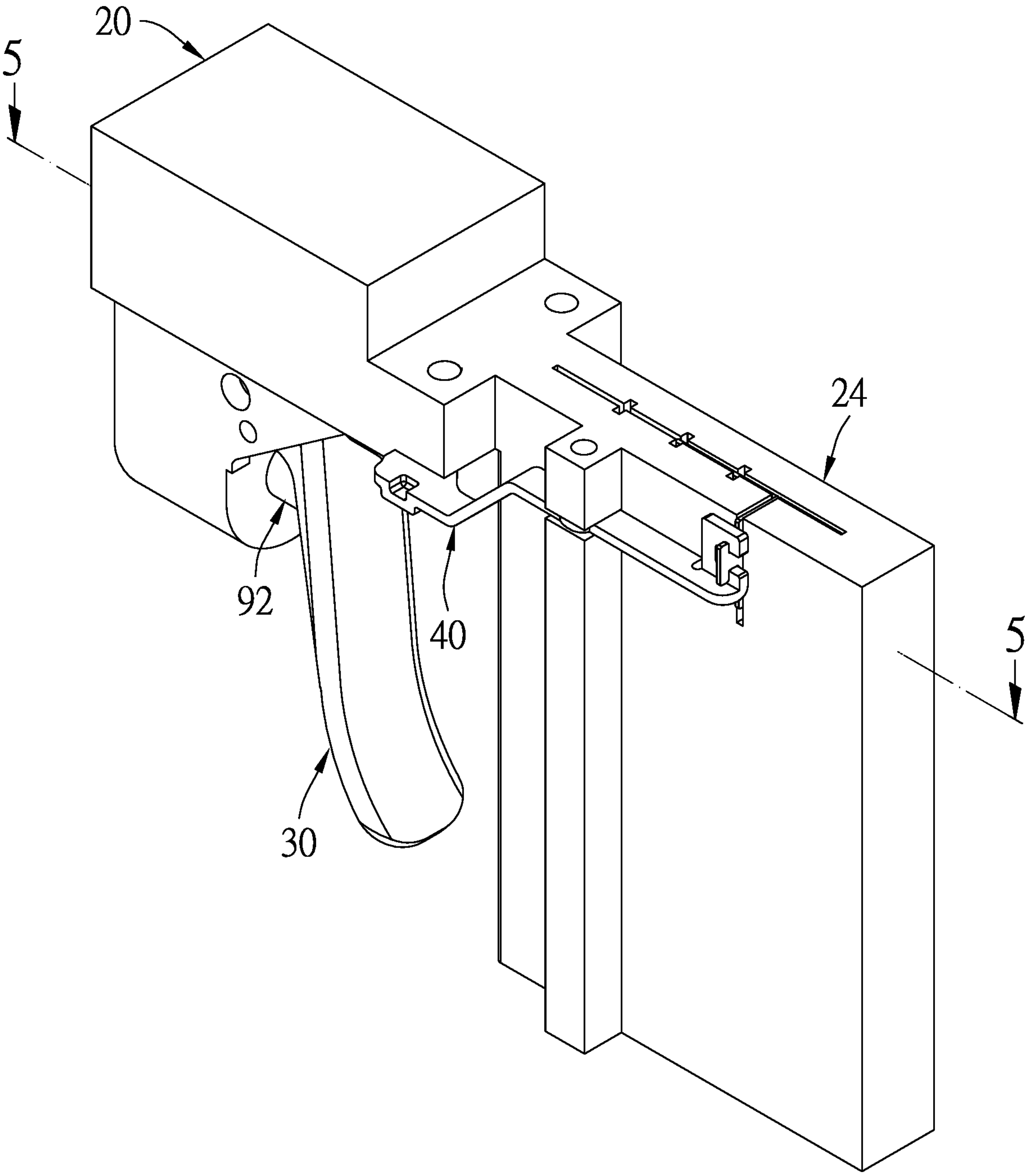
FIG. 3 is a three-dimensional assembly view of the first embodiment of the present invention.
Figure 4:
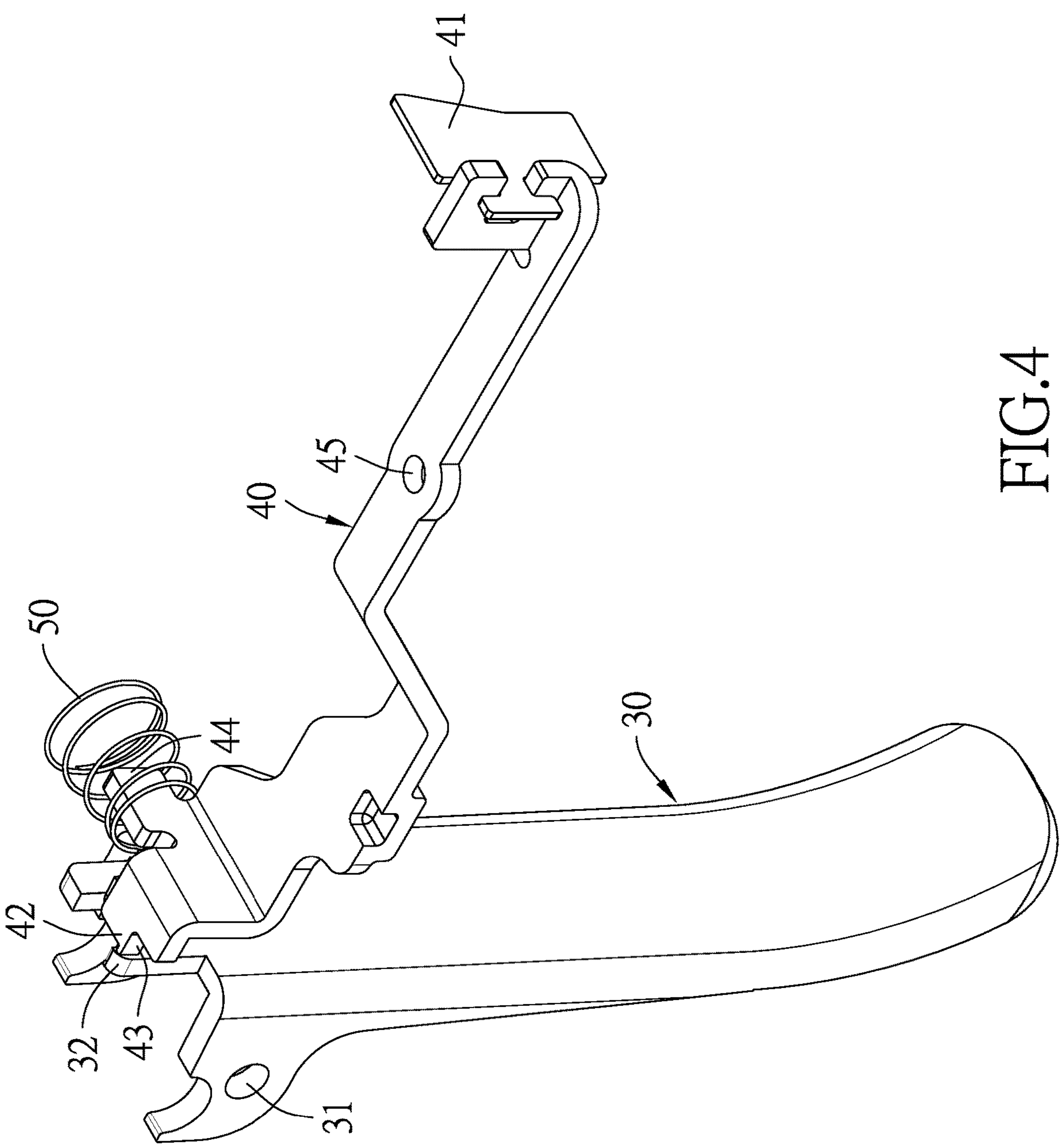
FIG. 4 is a three-dimensional assembly view of the first embodiment of the present invention, showing the state of the combination of the trigger, the connecting rod, and the spring.
Figure 5:
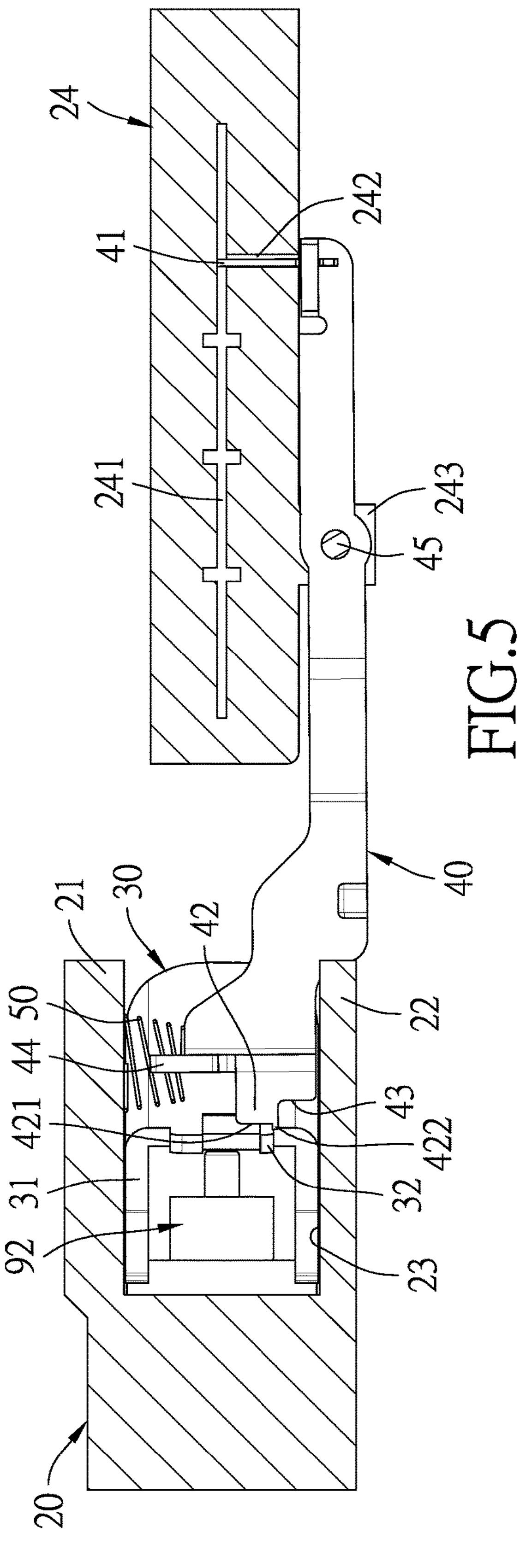
FIG. 5 is a cross-sectional view taken along the line 5-5 in FIG. 3.

The connecting rod 40 is pivoted to the gun body 20 and capable of being moved between an actuating position (as shown in FIG. 6) and a locking position (as shown in FIG. 5), and includes a sensing portion 41 located in or away from the nail groove 241, a limit portion 42 located in the actuating space 23 and facing the abutting portion 32, an actuating concave portion 43 located in the actuating space 23 and adjacent to the limit portion 42, and a side portion 44 located in the actuating space 23 and facing the first side plate portion 21, and a pivot portion 45 located between the sensing portion 41 and the limit portion 42 and pivoted to the side pivot portion 243 of the magazine 24; In this embodiment, the sensing portion 41 is in the form of a plate disposed at one end of the connecting rod 40, and the sensing portion 41 remains inserted in the side groove 242 of the magazine 24. When the connecting rod 40 is in the actuating position (as shown in FIG. 6), the sensing portion 41 moves out of the nail groove 241, the limit portion 42 is misaligned with the abutting portion 32, allowing the trigger 30 to be pressed. When the connecting rod 40 is in the locking position (as shown in FIG. 5), the sensing portion 41 is located in the nail groove 241, and the limit portion 42 is aligned with the abutting portion 32, so that the trigger 30 cannot be pressed.

The spring 50 is a compression spring and is located between the side portion 44 of the connecting rod 40 and the first side plate portion 21 of the gun body 20. When there is no nail 91 in the nail groove 241, the spring 50 can push the connecting rod 40 from the actuating position to the locking position.

The above is a configuration description of the main components of the first embodiment of the present invention. As for the operation method and efficacy of the present invention, please refer to the following description.

As shown in FIG. 6, when the sensing portion 41 of the connecting rod 40 senses the presence of nails 91 in the nail groove 241, the nails 91 will push the sensing portion 41 outward, causing the connecting rod 40 to pivot clockwise by an angle around the pivot portion 45, causing the side portion 44 of the connecting rod 40 to press against the spring 50 to accumulate an elastic restoring force, and at the same time, causing the limit portion 42 of the connecting rod 40 to be misaligned with the abutting portion 32 of the trigger 30, and making the actuating concave portion 43 of the connecting rod 40 aligned with the abutting portion 32 of the trigger 30. At this time, the trigger 30 can be pressed, thereby driving the actuator 92 to perform a nail striking action.

As shown in FIG. 5, after firing all the nails 91, as there are no nails 91 in the nail groove 241, the spring 50 releases the elastic force and causes the connecting rod 40 to pivot counterclockwise by an angle to push the connecting rod 40 from the actuating position to the locking position. At this time, the sensing portion 41 of the connecting rod 40 is partially located in the nail groove 241 to wait to sense nails 91. In addition, the limit portion 42 of the connecting rod 40 is aligned with the abutting portion 32 of the trigger 30, and the actuating concave portion 43 of the connecting rod 40 is misaligned with the abutting portion 32 of the trigger 30. At this time, when the trigger 30 is pressed, the abutting portion 32 of the trigger 30 presses against the limit portion 42 of the connecting rod 40, so that the trigger 30 cannot be fully pressed, thus unable to drive the actuator 92 to complete the nail striking action.

It is worth noting that, as shown in FIG. 5, the limit portion 42 of the connecting rod 40 is specially designed in this embodiment to have a limit plane 421 and a limit convex 422 connected to the limit plane 421. The limit convex 422 is adjacent to the actuating concave portion 43 and presents a high and low state with the limit plane 421. When the connecting rod 40 is pushed from the actuating position to the locking position, the limit plane 421 is aligned with the abutting portion 32 of the trigger 30, and the limit convex 422 is misaligned with the abutting portion 32 of the trigger 30. At this time, when the trigger 30 is pressed, the abutting portion 32 of the trigger 30 will be pressed against the limit plane 421 of the limit portion 42 of the connecting rod 40, so that the trigger 30 cannot be fully pressed. At the same time, the abutting portion 32 of the trigger 30 is located at the lateral side of the limit convex 422 of the connecting rod 40, which limits the rotation of the connecting rod 40 and prevents it from rotating clockwise, and prevents the limit portion 42 of the connecting rod 40 from being misaligned with the abutting portion 32 of the trigger 30 to perform a pressing action without nails which would cause damage to the striker and the working object.

According to this, the present invention not only has a limit portion 42 at one end of the connecting rod 40, but also places the limit portion 42 in the actuating space 23 of the gun body 20 and make the limit portion 42 be aligned or misaligned with the abutting portion 32 of the trigger 30, which can indeed avoid empty firing of the nail gun's striker.

On the other hand, due to the special design of the limit portion 42 and the spring 50 of the connecting rod 40 in the present invention, which are hidden in the actuating space 23 of the gun body 20 and not located outside the gun body 20, it can effectively avoid environmental-pollution caused failure. At the same time, the empty-firing prevention safety device for a nail gun provided by the present invention is only composed of a gun body 20, a trigger 30, a connecting rod 40, and a spring 50, and has few components and simple structure, so as to effectively reduce the cost.

Figure 7:
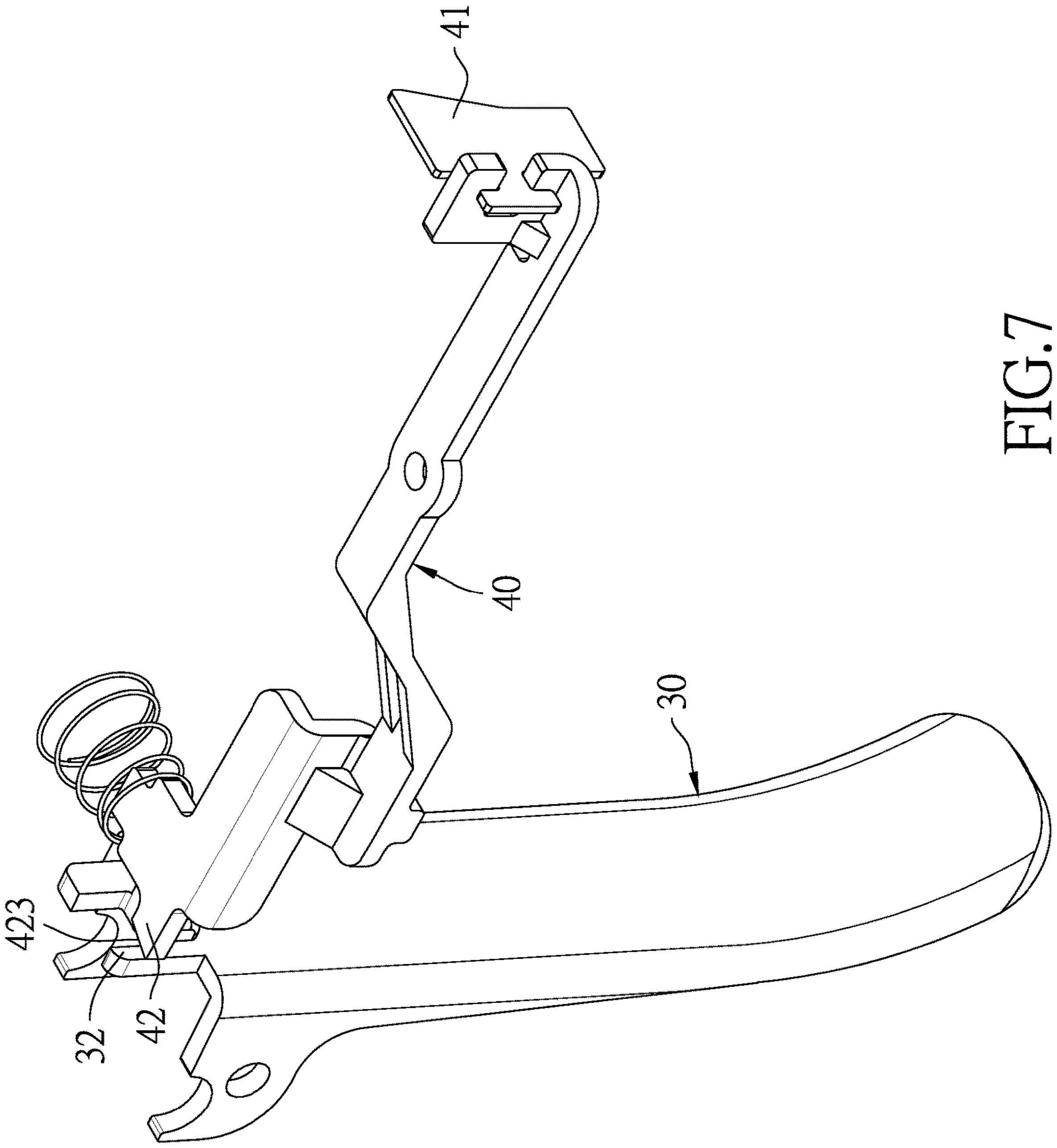
FIG. 7 is a three-dimensional assembly view of the second embodiment of the present invention, showing the state of the combination of the trigger, the connecting rod, and the spring.
Figure 8:
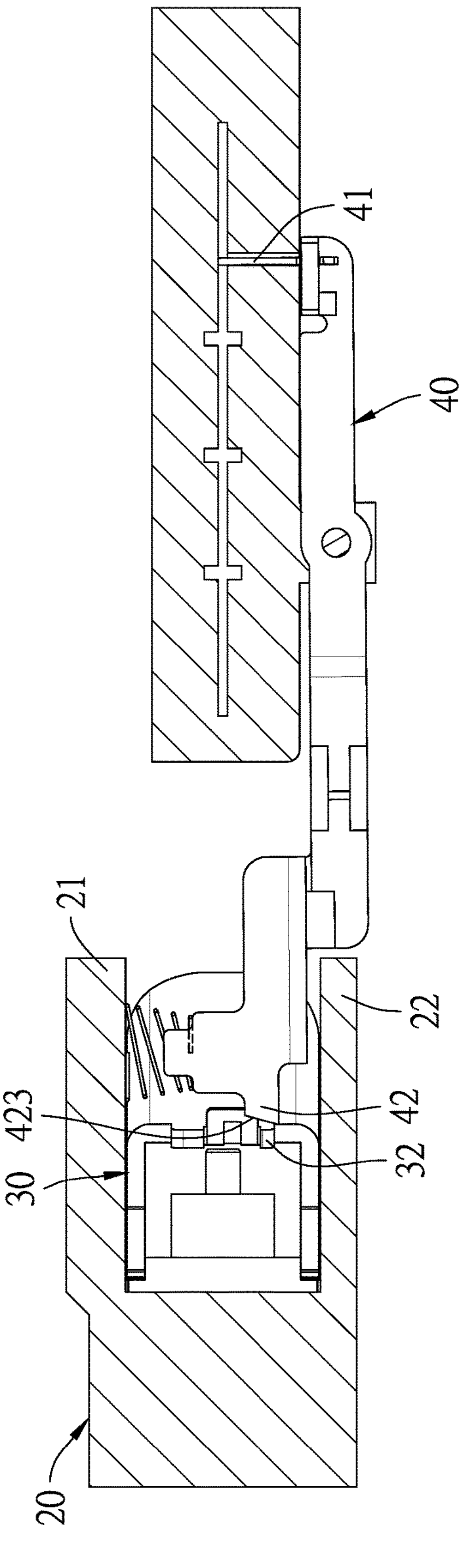
FIG. 8 is a schematic diagram of the second embodiment of the present invention, showing that the connecting rod is in the locking position.
Figure 9:
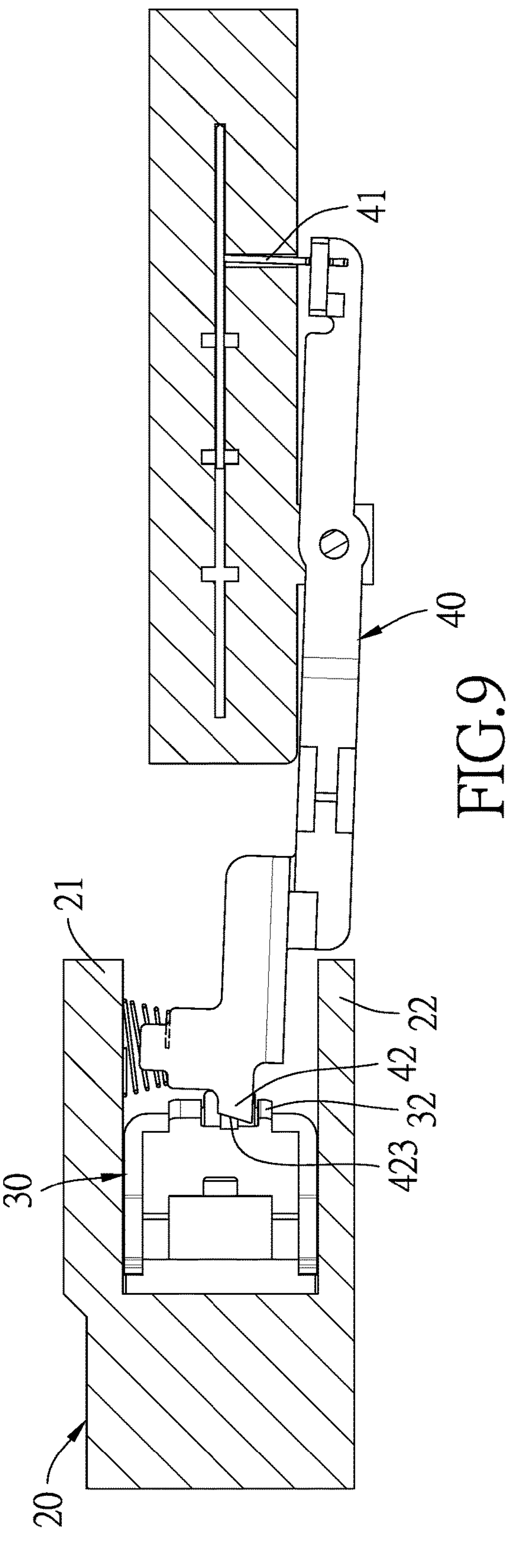
FIG. 9 is a schematic diagram of the second embodiment of the present invention, showing that the connecting rod is in the actuating position.

Please refer to FIGS. 7 to 9, the second embodiment of the present invention provides an empty-firing prevention safety device for a nail gun, which differs from the first embodiment in that:

The limit portion 42 of the connecting rod 40 includes a limit slope 423 facing the abutting portion 32 of the trigger 30, which is inclined from the first side plate portion 21 of the gun body 20 towards the second side plate portion 22 and gradually approaches the abutting portion 32.

Based on this, as shown in FIG. 8, when the connecting rod 40 is in the locking position, the limit slope 423 of the limit portion 42 of the connecting rod 40 is aligned with the abutting portion 32 of the trigger 30. When the trigger 30 is pressed and the abutting portion 32 is pressed against the limit slope 423 of the connecting rod 40, the tilt direction of the limit slope 423 is designed so that the connecting rod 40 can only rotate counterclockwise to move the sensing portion 41 of the connecting rod 40 further towards the direction of the nail groove 241, and ensure that the limit portion 42 of the connecting rod 40 and the abutting portion 32 of the trigger 30 are kept in an aligned state to avoid clockwise rotation of the connecting rod 40, and preventing the limit portion 42 of the connecting rod 40 from being be misaligned with the abutting portion 32 of the trigger 30 to perform a pressing action without nails which would cause damage to the striker and the working object.

Figure 10:
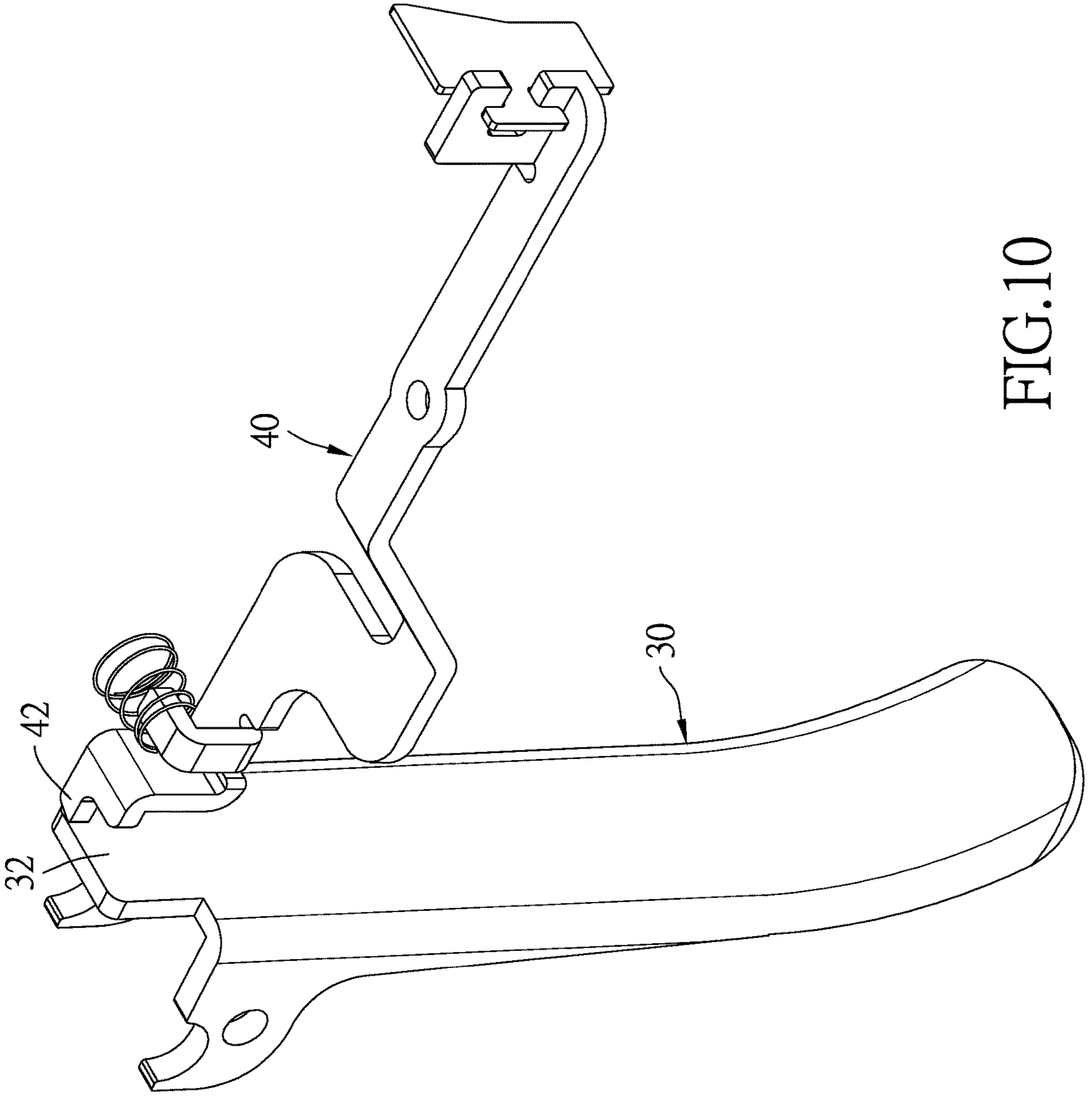
FIG. 10 is a three-dimensional assembly view of the third embodiment of the present invention, showing the state of the combination of the trigger, the connecting rod, and the spring.
Figure 11:
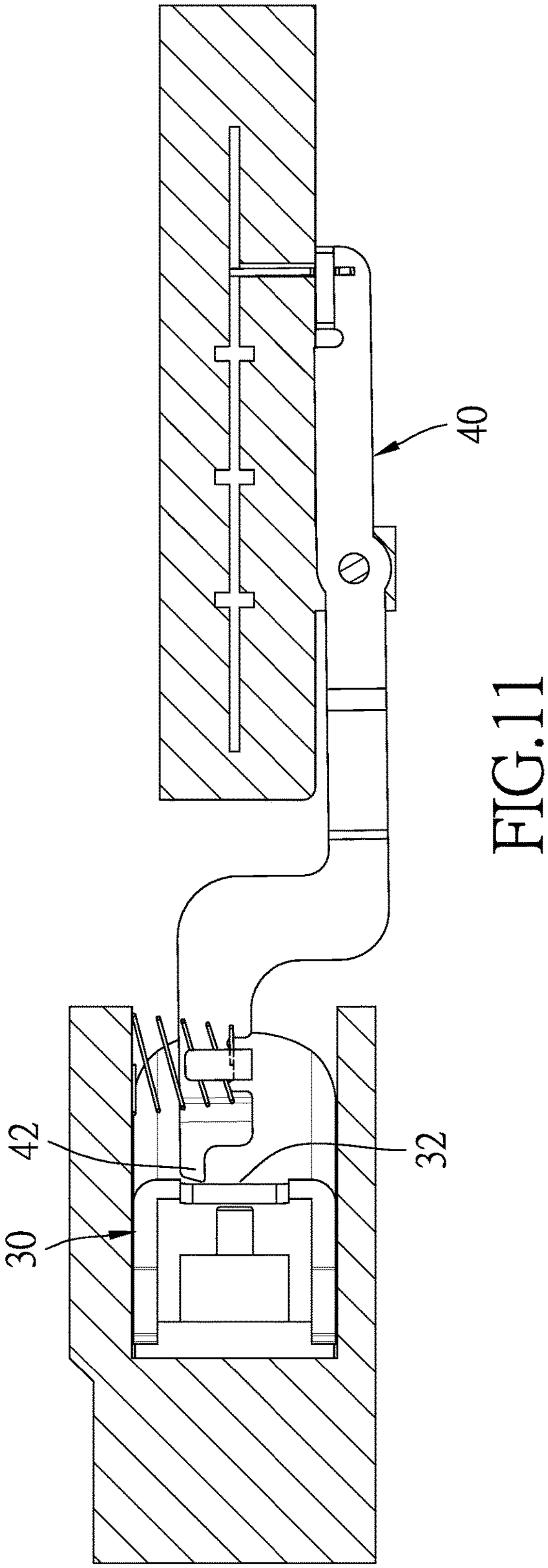
FIG. 11 is a schematic diagram of the third embodiment of the present invention, showing that the connecting rod is in the locking position.
Figure 12:
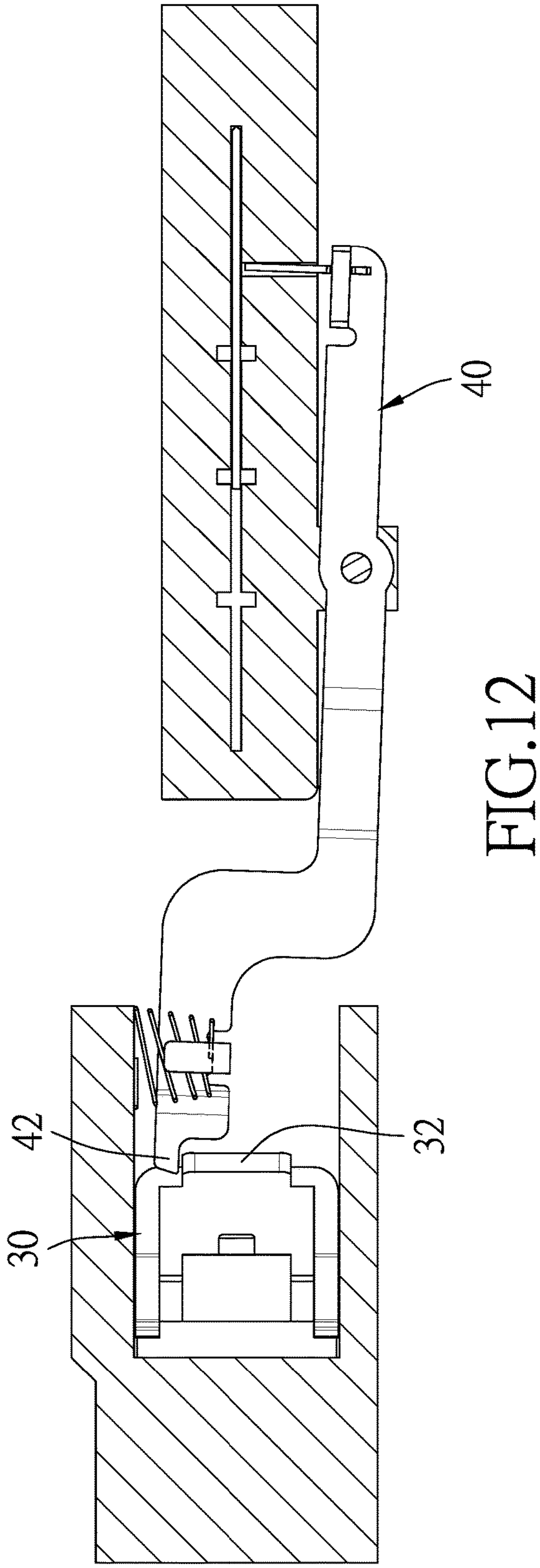
FIG. 12 is a schematic diagram of the third embodiment of the present invention, showing that the connecting rod is in the actuating position.

Please refer to FIGS. 10 to 12, the third embodiment of the present invention provides an empty-firing prevention safety device for a nail gun, which differs from the second embodiment in that:

The abutting portion 32 of the trigger 30 is located in the center of the trigger 30, and has a width greater than the width of the limit portion 42 of the connecting rod 40. Besides, the limit portion 42 of the connecting rod 40 is located on the right side of the trigger 30, thereby forming another implementation state.

Figure 13:
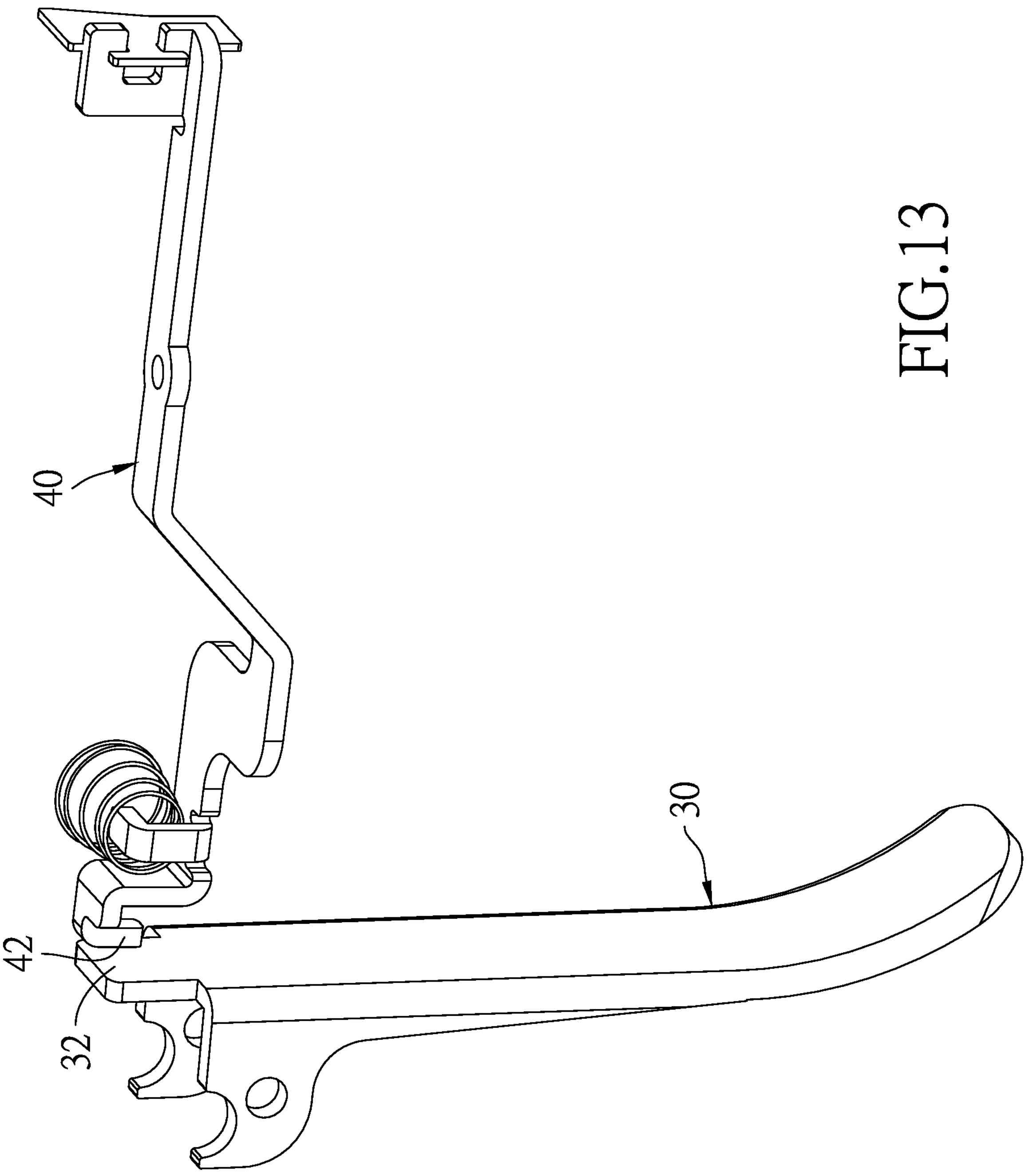
FIG. 13 is a three-dimensional assembly view of the fourth embodiment of the present invention, showing the state of the combination of the trigger, the connecting rod, and the spring.

Please refer to FIG. 13, the fourth embodiment of the present invention provides an empty-firing prevention safety device for a nail gun, which differs from the third embodiment in that:

The abutting portion 32 of the trigger 30 is located in the center, and has a width greater than the width of the limit portion 42 of the connecting rod 40. Besides, the limit portion 42 of the connecting rod 40 is bent downwards by an angle and has a large contact area corresponding to the abutting portion 32 of the trigger 30, thereby forming another implementation state.

Figure 14:
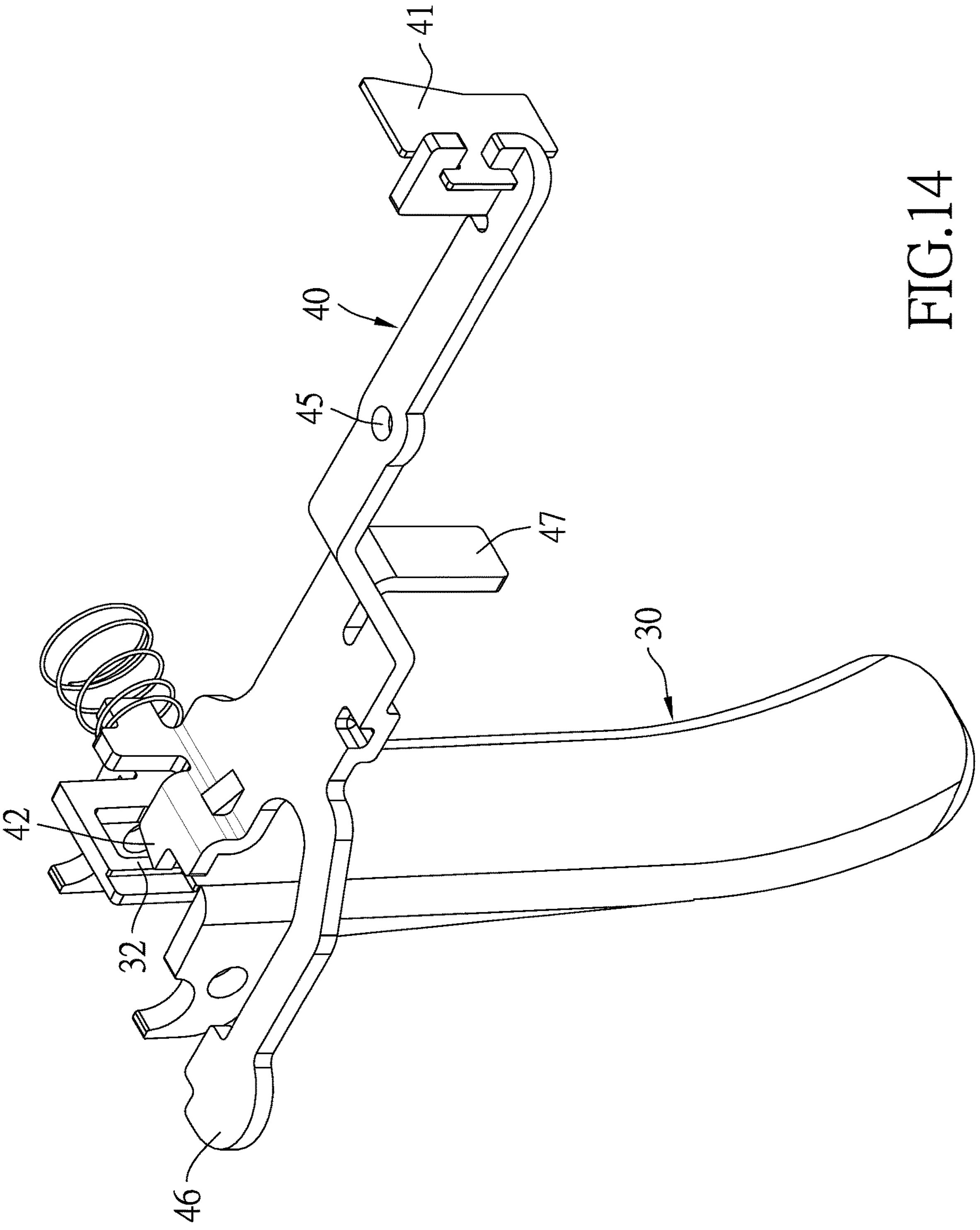
FIG. 14 is a three-dimensional assembly view of the fifth embodiment of the present invention, showing the state of the combination of the trigger, the connecting rod, and the spring.
Figure 15:
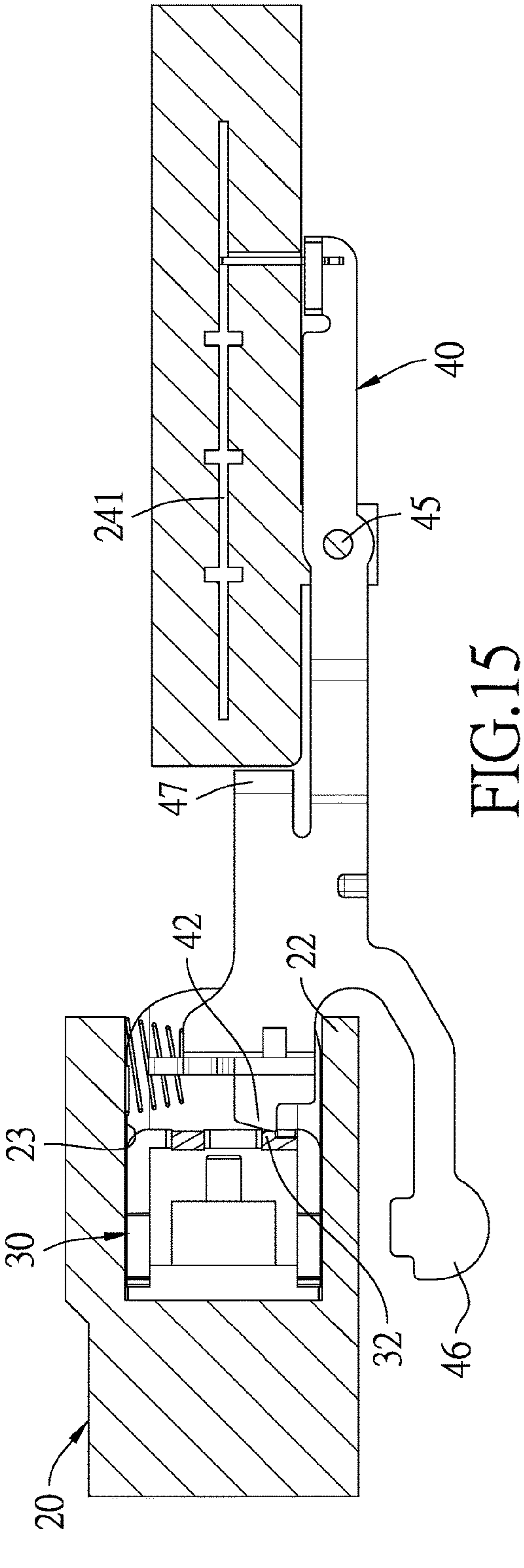
FIG. 15 is a schematic diagram of the fifth embodiment of the present invention, showing that the connecting rod is in the locking position.
Figure 16:
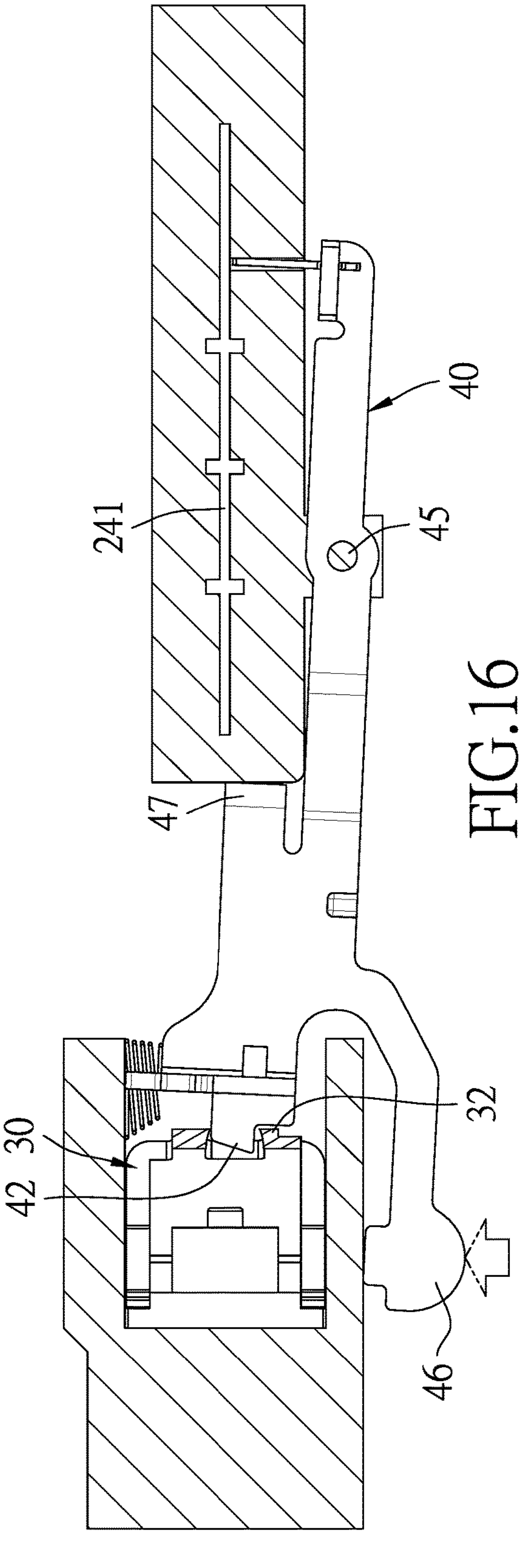
FIG. 16 is a schematic diagram of the fifth embodiment of the present invention, showing the state where there are no nails, pressing the pressing portion to make the connecting rod in the actuating position.

Please refer to FIGS. 14 to 16, the fifth embodiment of the present invention provides an empty-firing prevention safety device for a nail gun, which differs from the first embodiment in that:

The connecting rod 40 further includes a first pressing portion 46 and a second pressing portion 47 located outside the actuating space 23 of the gun body 20. The first pressing portion 46 and the second pressing portion 47 are located on the same side as the limit portion 42, with the pivot portion 45 as the boundary. The first pressing portion 46 is located outside the second side plate portion 22 of the gun body 20, and the second pressing portion 47 is located between the limit portion 42 and the pivot portion 45 and extends downwards.

According to this, as shown in FIG. 15, when the connecting rod 40 is in the locking position (i.e. there are no nails in the nail groove 241), the limit portion 42 of the connecting rod 40 is aligned with the abutting portion 32 of the trigger 30, and it is not possible to fully press the trigger 30. At this time, if you want to confirm again that there is no residual nail in the nail groove 241 (or completely remove all the nails from the nail groove 241), refer to FIG. 16, the user presses the first pressing portion 46 or the second pressing portion 47 of the connecting rod 40, forcing the connecting rod 40 to pivot clockwise by an angle about the pivot portion 45, causing the limit portion 42 of the connecting rod 40 to be misaligned with the abutting portion 32 of the trigger 30, so that the trigger 30 can be pulled for firing action to confirm that there is no residual nail in the nail groove 241 (or completely remove all the nails from the nail groove 241).

Figure 17:
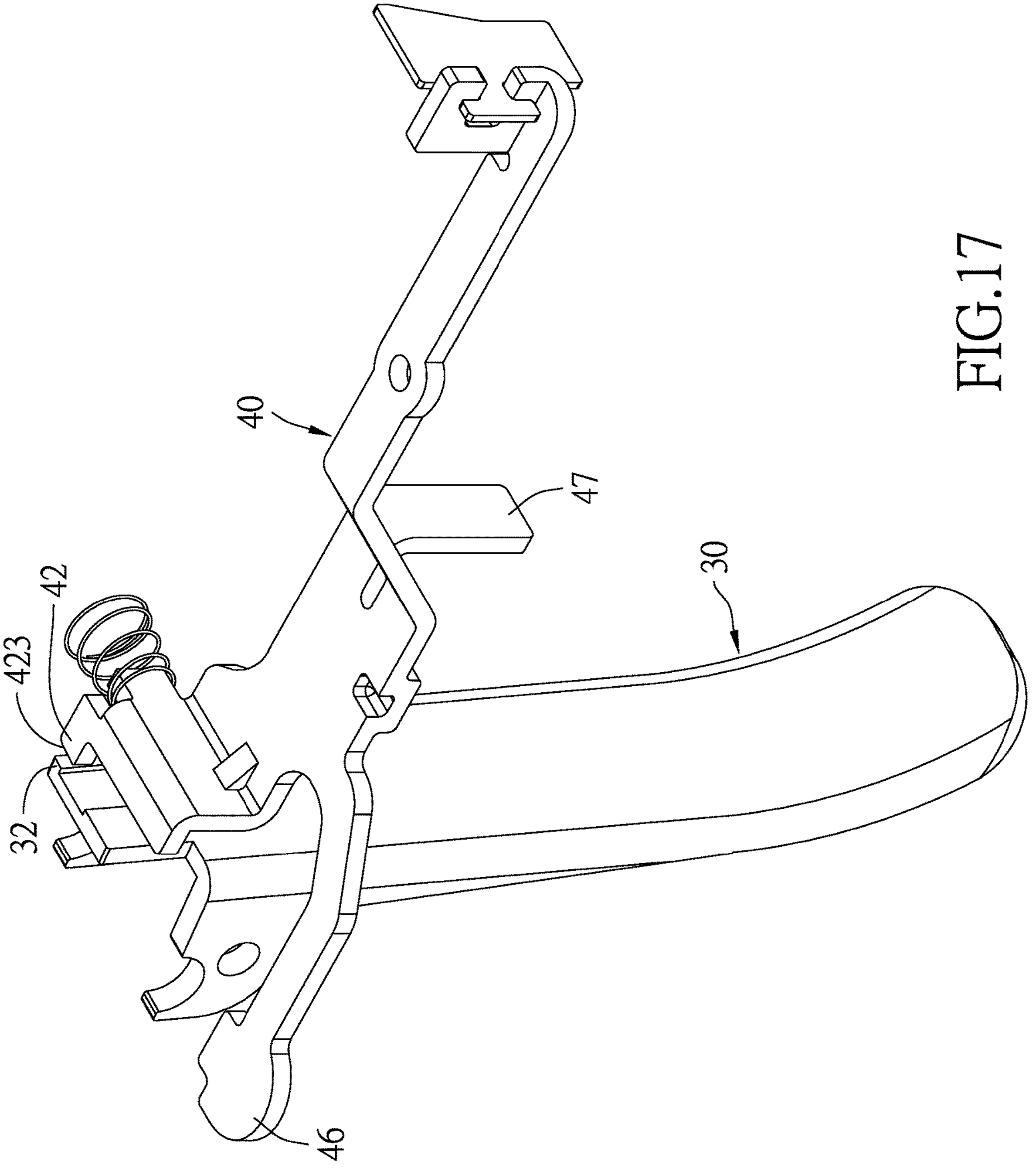
FIG. 17 is a three-dimensional assembly view of the sixth embodiment of the present invention, showing the state of the combination of the trigger, the connecting rod, and the spring.

Please refer to FIG. 17, the sixth embodiment of the present invention provides an empty-firing prevention safety device for a nail gun, which is a combined design of the second, third, and fifth embodiments:

That is to say, in addition to having a first pressing portion 46 and a second pressing portion 47 located outside the actuating space of the gun body, the limit portion 42 of the connecting rod 40 includes a limit slope 423 facing the abutting portion 32 of the trigger 30, and the limit slope 423 is inclined towards the direction of the first pressing portion 46 and gradually approaches the abutting portion 32; Furthermore, the limit portion 42 of the connecting rod 40 further includes a limit plane and a limit convex, presenting a high and low structural design. When the connecting rod 40 is pushed from the actuating position to the locking position, the limit plane 421 is aligned with the abutting portion 32 of the trigger 30, and the limit convex 422 is misaligned with the abutting portion 32 of the trigger 30. At this time, the trigger 30 is pressed, the abutting portion 32 of the trigger 30 will press against the limit plane 421 of the limit portion 42 of the connecting rod 40, so the trigger 30 cannot be fully pressed. At the same time, the abutting portion 32 of the trigger 30 is located at the lateral side of the limit convex 422 of the connecting rod 40, which limits the rotation of the connecting rod 40 and prevents it from rotating clockwise, and prevents the limit portion 42 of the connecting rod 40 from being misaligned with the abutting portion 32 of the trigger 30 to perform a pressing action without nails which would cause damage to the striker and the working object.

The abutting portion 32 of the trigger 30 includes a groove shaped structural design, which allows it to engage with the convex shaped limit portion 42 of the connecting rod 40, so as to form another implementation state.

What is claimed is:

1. An empty-firing prevention safety device for a nail gun comprising:

a gun body including a first side plate portion, a second side plate portion facing the first side plate portion, an actuating space defined by the first side plate portion and the second side plate portion, and a nail groove;

a trigger, capable of being pressed, arranged between the first side plate portion and the second side plate portion of the gun body, and including an abutting portion located in the actuating space;

a connecting rod pivoted to the gun body and capable of being moved between an actuating position and a locking position, and including: a sensing portion located in or away from the nail groove, and a limit portion located in the actuating space and facing the abutting portion, when the connecting rod is in the actuating position, the sensing portion moves out of the nail groove, the limit portion is misaligned with the abutting portion, allowing the trigger to be pressed, and when the connecting rod is in the locking position, the sensing portion is located in the nail groove, and the limit portion is aligned with the abutting portion, so as to stop the trigger from being pressed;

wherein the connecting rod further includes a side portion located in the actuating space and facing the first side plate portion, the safety device further comprises a spring located between the side portion and the first side plate portion, when there is no nail in the nail groove, the spring pushes the connecting rod from the actuating position to the locking position.

2. The empty-firing prevention safety device for the nail gun as claimed in claim 1, wherein the limit portion of the connecting rod includes a limit slope facing the abutting portion of the trigger, and the limit slope is inclined from the first side plate portion towards the second side plate portion and gradually approaches the abutting portion.

3. The empty-firing prevention safety device for the nail gun as claimed in claim 2, wherein the connecting rod further includes a pressing portion located outside the actuating space, when the connecting rod is in the locking position, by pressing the pressing portion, the limit portion is misaligned with the abutting portion to allow the trigger to be pressed.

4. The empty-firing prevention safety device for the nail gun as claimed in claim 3, wherein the limit portion of the connecting rod includes a limit plane and a limit convex connected to the limit plane, when the connecting rod is in the locking position, the limit plane is aligned with the abutting portion of the trigger, and the limit convex is misaligned with the abutting portion of the trigger.

5. The empty-firing prevention safety device for the nail gun as claimed in claim 1, wherein the connecting rod further includes an actuating concave portion located in the actuating space and adjacent to the limit portion, when the connecting rod is in the actuating position, the actuating concave portion is aligned with the abutting portion of the trigger, and when the connecting rod is in the locking position, the actuating concave portion is misaligned with the abutting portion of the trigger.

6. The empty-firing prevention safety device for the nail gun as claimed in claim 1, wherein the gun body is connected to a magazine, the magazine includes the nail groove, and the connecting rod further includes a pivot portion located between the sensing portion and the limit portion and pivoted to the magazine.

7. The empty-firing prevention safety device for the nail gun as claimed in claim 1, wherein the abutting portion of the trigger is located in the center of the trigger, and has a width greater than the width of the limit portion of the connecting rod.

8. The empty-firing prevention safety device for the nail gun as claimed in claim 1, wherein the connecting rod further includes a pressing portion located outside the actuating space, when the connecting rod is in the locking position, by pressing the pressing portion, the limit portion is misaligned with the abutting portion to allow the trigger to be pressed.

9. The empty-firing prevention safety device for the nail gun as claimed in claim 8, wherein the limit portion of the connecting rod includes a limit plane and a limit convex connected to the limit plane, when the connecting rod is in the locking position, the limit plane is aligned with the abutting portion of the trigger, and the limit convex is misaligned with the abutting portion of the trigger.

* * * * *